Sept. 23, 1941.   H. D. GEYER   2,256,709
CLUTCH DRIVEN PLATE
Filed April 15, 1940

Inventor
Harvey D. Geyer
By Blackmore, Spencer & Flint
Attorney

Patented Sept. 23, 1941

2,256,709

UNITED STATES PATENT OFFICE 2,256,709

CLUTCH DRIVEN PLATE

Harvey D. Geyer, Dayton, Ohio, assignor to General Motors Corporation, Detroit, Mich., a corporation of Delaware Application April 15, 1940, Serial No. 329,589

4 Claims. (Cl. 192—107)

This invention relates to clutches and is more particularly concerned with the driven plate which is gripped between the engine flywheel and the pressure plate.

An object of the invention is to provide a yielding engagement of the members to thereby secure smooth operation.

Another object is to provide such yielding engagement by the use of a normally flat spring plate which assumes a distorted form as the driving and driven members engage.

Other objects and advantages will appear from the description which follows.

Figure 1:
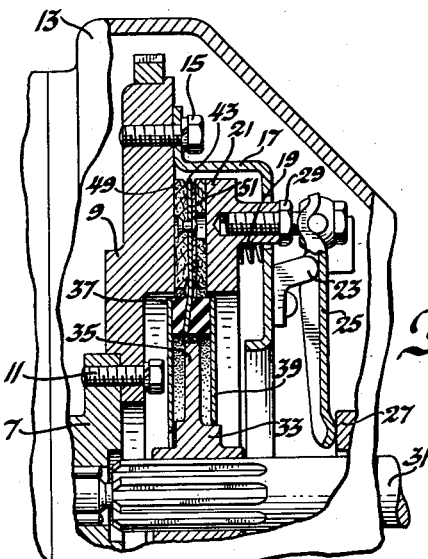
Figure 1 is a transverse section through a vehicle clutch in which the invention is embodied.
Figure 3:
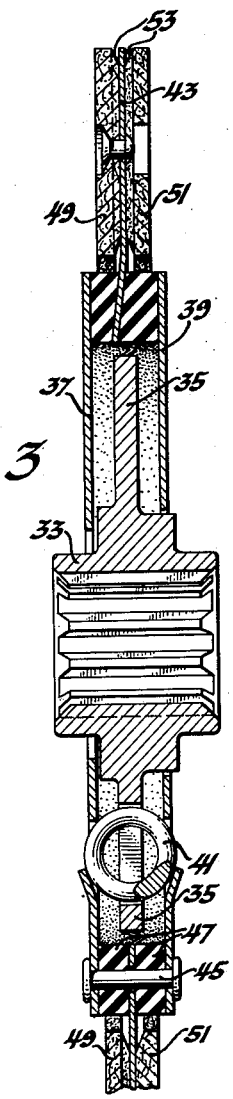
Figure 3 is a section on line 3—3 of Figure 2.
Figure 2:
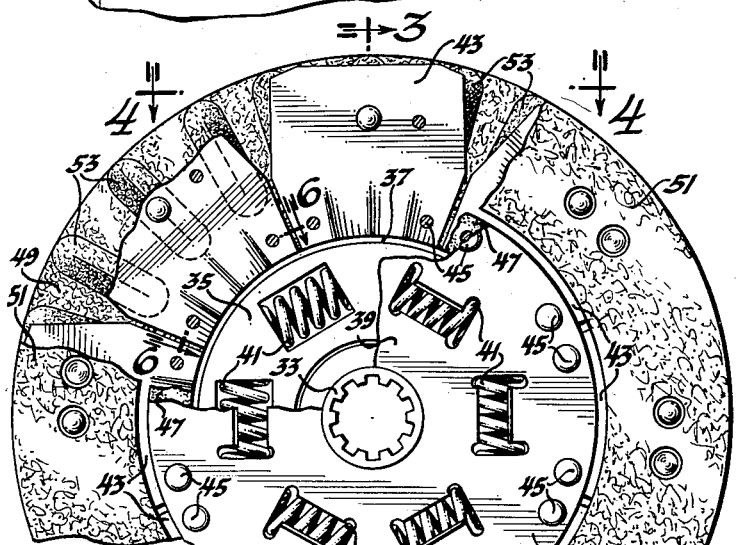
Figure 2 is a view in elevation, partly broken away, of the driven plate.

Referring to the several figures, numeral 7 represents the crankshaft of an engine and 9 is the flywheel secured thereto at 11, these parts being enclosed within a conventional housing 13. At 15 there is secured to the flywheel an abutment plate 17 for clutch engaging springs, one of which is indicated by numeral 19. These springs press a pressure plate 21 toward the flywheel to grip the driven plate. At 23 is shown one of several fulcra on plate 17 and levers or fingers 25 are adapted to rotate clockwise about these fulcra when pressed by a conventional throwout member 27. The levers are connected to the pressure plate by means such as 29 whereby the pressure plate is moved away from the flywheel in the act of clutch release.

The driven shaft or transmission shaft is marked 31. It is this shaft which carries the driven plate. The driven plate includes a hub 33 non-rotatably mounted on shaft 31. To cushion the driving torque between the hub and the peripheral portion of the driven plate the hub has radial flanges such as 35 located between plates 37 and 39 which may rotate about the hub. In a well-known way springs 41 located in registering apertures of the flange and plates cushion the driving torque therebetween. Plates 37 and 39 do not extend radially into the region where the flywheel and pressure plate engage the driven plate. This working part of the driven plate is made up of a plurality of normally flat steel spring segments 43. Pins 45 connect the plates 37 and 39 and extend through somewhat enlarged openings adjacent the inner margins of the several spring segmental plates. On either side of this inner marginal edge of each spring segment and between the segment and plates 37 and 39 there are arcurate strips of rubber 47. These rubber members are molded to the segment and to the plates.

The friction facings 49 and 51 are continuous rings. Their remote faces which engage the flywheel and pressure plate are flat and parallel. Their adjacent faces are formed with radially extending ridges such as 53 with valleys therebetween. In the case of each segment there may be three symmetrically arranged ridges on one facing in contact with the segment with two valleys between the ridges while on the other side of the segment there are two ridges on the opposite facing disposed opposite the valleys of the first facing. The facings are to be riveted to each segment, there being preferably two rivets connected to each segment, one to secure each facing as shown.

Figure 4:
Figure 4 is a section on line 4—4 of Figure 2.
Figure 5:
Figure 5 is a view like Figure 4 but showing the parts displaced.
Figure 6:
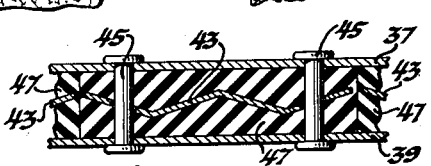
Figure 6 is a section on line 6—6 of Figure 2.

When the clutch engages it will be seen that the normally flat spring segments are distorted in a way which will be better appreciated by comparing Figure 5 with Figure 4. The spring resistance to the distortion opposes the action of springs 19 and produce a smooth clutch action. The rubber bond at 47 makes it possible for the distortion to take place throughout the radial extent of the spring segment as shown by Figure 6. This avoids the necessity of so shaping the segmental plate that the distortion of its outer part may occur without interfering with the inner region where the spring plates are attached.

I claim:

1. A driven clutch plate assembly comprising a hub portion, an intermediate portion connected thereto, and an outer portion, said outer portion being made up of a plurality of normally substantially flat spring segments, means whereby said segments are bent in clutch engaging position, incompressible cushioning means to bond each segment at its inner margin to the outer margin of the intermediate portion whereby said segments may bend throughout their radial extent.

2. The invention defined by claim 1, said first named means comprising a ring-shaped facing on each side of said segments, means to secure each facing to each segment.

3. The invention defined by claim 1, said first named means comprising ring-shaped facings, one on each side of said segments and secured thereto, the adjacent surfaces of said facings having spaced ridges in contact with the segments and valleys between the ridges, the ridges of the two facings being staggered whereby the segments yield resiliently to resist clutch engagement.

4. The invention defined by claim 1, said first named means comprising ring-shaped facings, one on each side of said segments and secured thereto, the adjacent surfaces of said facings having radially extending spaced ridges in contact with the segments and valleys between the ridges, the ridges of the two facings being staggered whereby the segments yield resiliently to resist clutch engagement.

HARVEY D. GEYER.